(12) United States Patent
Hofmann et al.

(10) Patent No.: US 9,664,245 B2
(45) Date of Patent: May 30, 2017

(54) BRAKE ASSEMBLY AND FRICTION LINING FOR A BRAKE ASSEMBLY

(71) Applicant: ITW FASTENER PRODUCTS GmbH, Iserlohn (DE)

(72) Inventors: Juergen Hofmann, Eisenberg (DE); Michael Demerath, Hueffler (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/969,312

(22) Filed: Dec. 15, 2015

(65) Prior Publication Data
US 2016/0208874 A1  Jul. 21, 2016

(30) Foreign Application Priority Data
Jan. 21, 2015 (DE) .................. 10 2015 100 826

(51) Int. Cl.
| F16D 69/02 | (2006.01) |
| B60H 1/34 | (2006.01) |
| F16D 49/00 | (2006.01) |
| F16D 69/00 | (2006.01) |
| F16D 71/00 | (2006.01) |

(52) U.S. Cl.
CPC .......... *F16D 69/02* (2013.01); *B60H 1/3414* (2013.01); *F16D 49/00* (2013.01); *F16D 69/00* (2013.01); *F16D 71/00* (2013.01); *B60H 2001/3464* (2013.01)

(58) Field of Classification Search
CPC .......... F16D 69/00; F16D 69/02; F16D 49/00; F16D 71/00

USPC ........................................ 188/82.1, 130, 290
See application file for complete search history.

(56) References Cited

U.S. PATENT DOCUMENTS

| 2,491,229 A * | 12/1949 | Taylor ................... F16F 7/02 248/568 |
| 2,775,317 A * | 12/1956 | Sinisterra ............... F16F 9/12 188/268 |
| 5,542,508 A * | 8/1996 | Van Erden ............ F16F 1/445 188/130 |
| 5,605,208 A * | 2/1997 | Friedrichsen ......... F16F 7/04 16/354 |

(Continued)

FOREIGN PATENT DOCUMENTS

| DE | 707617 | 6/1941 |
| DE | 930127 | 7/1955 |

(Continued)

OTHER PUBLICATIONS

Communication from European Patent Office regarding EP App. No. 15197575,2-1756/3047988, dated Oct. 5, 2016.

*Primary Examiner* — Thomas J Williams
(74) *Attorney, Agent, or Firm* — Joseph M. Butscher; The Small Patent Law Group, LLC

(57) ABSTRACT

In a brake assembly for an air vent in a vehicle, comprising two brake components which are movable relative to each other, wherein on at least one brake component a friction lining is provided, which rubbingly rests against the respective other brake component and inhibits a mutual movement of the brake components, it is provided that the friction lining is made of a thermoplastic elastomer which contains a silicone admixture. A friction lining for such brake assembly is made of a thermoplastic elastomer which contains a silicone admixture.

12 Claims, 1 Drawing Sheet

(56) References Cited

U.S. PATENT DOCUMENTS

| | | | |
|---|---|---|---|
| 5,713,623 A * | 2/1998 | Mattingly | B60R 7/04 16/337 |
| 6,417,293 B1 | 7/2002 | Chorvath et al. | |
| 8,550,222 B2 * | 10/2013 | Browne | F16D 28/00 188/266.7 |
| 2005/0121240 A1 | 6/2005 | Aase | |
| 2005/0228157 A1 * | 10/2005 | Peterson | B32B 15/08 526/348.5 |
| 2006/0283673 A1 | 12/2006 | Lamport | |
| 2009/0137200 A1 | 5/2009 | Fujiwara | |
| 2011/0105011 A1 | 5/2011 | Dubensky et al. | |
| 2012/0034467 A1 * | 2/2012 | Nagasaka | C08F 212/12 428/412 |
| 2013/0065505 A1 | 3/2013 | Yoskowitz | |

FOREIGN PATENT DOCUMENTS

| | | |
|---|---|---|
| DE | 20309732 | 9/2003 |
| DE | 102004029395 | 1/2006 |
| DE | 202008008882 | 4/2009 |
| EP | 1591679 | 11/2005 |
| EP | 2418246 | 2/2012 |
| EP | 2436947 | 4/2012 |
| EP | 2752624 | 7/2014 |
| JP | 2008195133 | 8/2008 |
| JP | 2011137067 | 7/2011 |
| WO | WO 2013185012 | 12/2013 |

* cited by examiner

BRAKE ASSEMBLY AND FRICTION LINING FOR A BRAKE ASSEMBLY

RELATED APPLICATION

This application claims priority from German Application No. 10 2015 100 826.2, filed Jan. 21, 2015, the subject matter of which is incorporated herein by reference in its entirety.

BACKGROUND OF THE INVENTION

The invention relates to a brake assembly for an air vent in a vehicle.

A brake assembly for an air vent in a vehicle is known which comprises two brake components which are movable relative to each other, wherein on at least one brake component a friction lining is provided which rubbingly rests against the respective other brake component and inhibits a mutual movement of the brake components. The invention furthermore relates to a friction lining for a brake assembly, in particular for a joint of an air vent.

In air vents tor vehicles, brake assemblies frequently are used on parts movable relative to each other, in order to inhibit the mutual movement of the components. This can be effected for example in a movable operating element which is rotatably or shiftably mounted on the air vent. Via the brake assembly, the operating element can be fixed in the respectively adjusted position, so that for example the direction or the intensity of the outflowing air can be adjusted reliably. Alternatively, a diverter can also be mounted in the air vent via a joint, for example a ball joint, wherein the brake assembly is arranged between the diverter and the air vent, for example in the joint, in order to avoid an undesired shifting of the diverter in operation of the vehicle. In addition, such brake assembly also are used in dosing elements, for example a dosing flap, in order to likewise hold the same in the adjusted position. Beside the safe fixation in an adjusted position, the brake assembly improves the haptics of the air vent, as a defined resistance is present when operating the air vent. In addition, undesired noises, such as rattling noises between the individual components, are prevented, as a clearance between the components also can be reduced or eliminated by the brake assembly.

The brake assembly should ensure a constant resistance between the brake components movable relative to each other over a period as long as possible. In addition, squeaking or undesired scraping noises should be prevented.

So far, friction linings of silicone are used, which are manufactured together with a brake component by a one-component injection molding method or by a two-component injection molding method. The production of such silicone components, however, is very expensive, as other manufacturing methods must be used than for the remaining plastic parts of an air vent. In addition, the silicone only has a limited abrasion resistance, so that already after a short period of use the resistance of the brake assembly decreases.

It is the object of the invention to provide a brake assembly for an air vent in a vehicle, which over an extended period provides a constant resistance between the brake components moving relative to each other. The object of the invention furthermore is to provide a friction lining for such brake assembly.

BRIEF DESCRIPTION OF THE INVENTION

In order to solve this object, there is provided a brake assembly for an air vent in a vehicle, comprising two brake components which are movable relative to each other. On at least one brake component a friction lining is provided, which rubbingly rests against the respective other brake component and inhibits a mutual movement of the brake components. The friction lining is made of a thermoplastic elastomer which contains a silicone admixture. A thermoplastic elastomer has a much better abrasion resistance than the silicone used so far. Furthermore, the manufacturing costs are much lower, in particular in two-component injection molded parts. By small admixtures of silicone, the positive effects of the silicone friction linings used so far can yet be utilized. With the friction lining according to the invention a much more resistant friction lining thus can be provided, so that the braking properties of the brake assembly can be maintained over a longer period.

Preferably, the amount of the silicone admixture lies in the range from 0.5% to 5%. With this silicone content, the positive properties of the silicone can be utilized without the abrasion resistance of the friction lining decreasing too much due a too high silicone content.

The friction lining for example can have a partly spherical friction surface and the respective other brake component can have a partly spherical contact surface for the friction lining. The brake assembly thus can be integrated into a ball joint, for example, so that a space-saving arrangement of the brake assembly within the air vent, in particular within a joint, is possible.

Preferably, the friction lining is positively and/or cohesively connected with the brake component, so that the same cannot detach from the brake component. In particular, the friction lining can be arranged in a cutout at the brake component, so that the same only slightly protrudes beyond the surface of the brake component. In this embodiment, the brake components for example can form a ball joint wherein the friction surface is arranged within the ball joint and inhibits mutual pivoting or rotating of the brake components.

The friction lining, however, can also be arranged on a carrier which is urged against the respective other brake component by spring action. By a spring which urges the friction lining or the carrier against a contact surface by spring action, a wear of the friction lining can be compensated in addition, so that the useful life of the brake assembly can be prolonged in addition.

The first or the second brake component for example are coupled with a diverter, an operating element or a closing flap, so that their movement can be inhibited. This provides for a better adjustment of the diverter, the operating element or the closing flap. In particular, the haptics of the air vent can be improved thereby.

The brake assembly can be used to inhibit any kind of movement between various brake components in the air vent. The diverter, the operating element or the closing flap thus can be pivoted, rotated or shifted in the air vent.

For the solution of the object a friction lining for such brake assembly furthermore is provided, in particular for a Joint of an air vent wherein the friction lining is made of a thermoplastic elastomer which contains a silicone admixture.

BRIEF DESCRIPTION OF THE DRAWINGS

Further advantages and features can be found in the following description in conjunction with the attached drawings, in which.

DESCRIPTION

Figure 1:
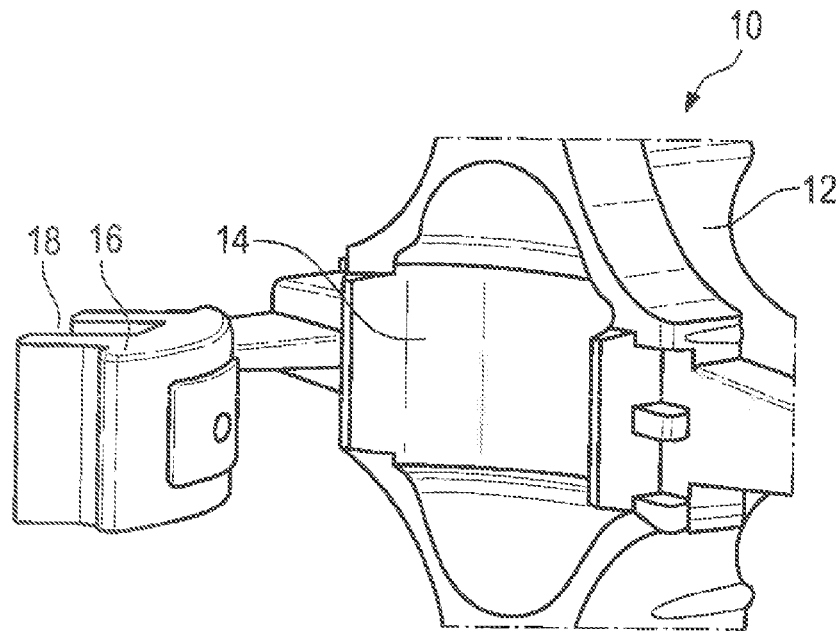
FIG. 1 shows a brake assembly according to the invention.
Figure 2:
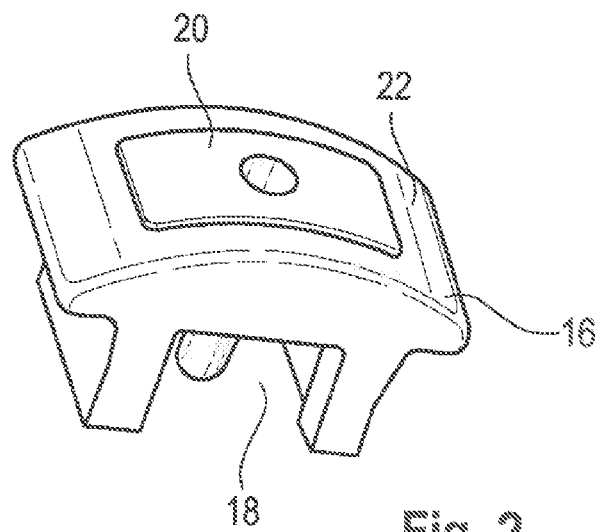
FIG. 2 shows a brake component of the brake assembly of FIG. 1 with a friction lining according to the invention.

FIG. 1 shows a brake assembly 10 for a joint of an air vent in a vehicle.

Such air vent usually has a housing in which an air deflector is pivotally mounted relative to the longitudinal axis of the air vent. The air deflector for example is rotatably and pivotally mounted in the housing of the air vent by means of a joint, wherein the bearing either can be arranged on the outside of the air deflector, if the same is formed spherical, or a separate joint, for example a ball joint is provided.

Such ball joint has a ball head and a bearing shell, wherein the ball head or the bearing shell are attached to the air deflector and the respective other component is firmly held at the vehicle. At the ball head and the bearing shell sliding surfaces are provided, which are formed such that the ball head can be pivoted and/or rotated in the bearing shell.

On at least one of the components ball head or bearing shell a friction lining is provided, by which the friction between the ball head and the bearing shell is increased. It thereby is ensured that after adjusting the outflow direction, the air deflector remains in the adjusted position and is not shifted, for example by vibrations in the vehicle.

The brake assembly 10 shown in FIG. 1 includes a first brake component 12 on which a partly spherical bearing shell 14 for such ball joint is provided. The second brake component 16 can be inserted in a cutout at the ball head and be urged against the bearing shell 14 by spring action of a spring which can engage a rear-side receptacle 18. The surface of the second brake component 16 is formed partly spherical, so that the same forms a portion of the ball head.

The second brake component 16 here forms a carrier on which a friction lining 20 is provided, which in the mounted condition of the brake assembly 10 rests against the first brake component 12, in particular against the bearing shell 14 and inhibits a mutual rotation or pivoting of the first and the second brake component 12, 16. By the spring force with which the second brake component 16 is urged against the bearing shell 14 the frictional resistance can be adjusted.

In the embodiment shown here, the friction lining 20 is positively and cohesively formed with the second brake component 16, in particular manufactured with the same by a two-component injection molding method.

The braking properties of the brake assembly 10 depend on the choice and the composition of the friction lining 20. To provide a comfortable operation of the air vent it is desired to provide constant operating forces of the air vent, i.e. a constant resistance of the brake assembly 10, over a period as long as possible. In addition, squeaking or scraping noises should be prevented reliably. A further requirement is that the resistance with which the two brake components 12, 16 can be moved relative to each other is as constant as possible during the operation of the brake assembly. An increased resistance at the beginning of the rotating or pivoting operation is not desired, as the same leads to increased operating forces and on loosening of the static friction of the brake components 12, 16 due to the employed higher operating forces, too strong pivoting or rotating of the brake components relative to each other and thus of the air deflector in the air vent is effected.

So far, friction linings 20 of silicone are used, whose production however is very expensive. In addition, silicone friction linings are worn very quickly, so that the operating forces decrease or an exchange of the friction linings 20 is required in shorter intervals.

To increase the abrasion resistance of the friction lining 20, a friction lining 20 of a thermoplastic elastomer is used instead of the known friction linings. Thermoplastic elastomers have a much higher abrasion resistance, so that the longevity of the brake assembly 10 and of the friction lining 20 can be improved distinctly.

To be able to continue to use the positive effects of the silicone friction linings, a silicone admixture is added to the thermoplastic elastomer. The same amounts to between 0.5% and 5%, so that a reduction of the abrasion resistance to a too high silicone content is avoided.

The material combination of a thermoplastic elastomer with a low silicone admixture leads to very good haptics, as constantly high operating forces are ensured over a very long period. In addition, an occurrence of a stick-slip effect, in which due to the static friction which is greater than the sliding friction jerking occurs due to the alternation between static and sliding friction, is prevented reliably.

In addition, undesired noises such as squeaking or scraping noises of the friction lining 20 are prevented by this material combination.

The invention claimed is:

1. A brake assembly for an air vent in a vehicle, comprising two brake components which are movable relative to each other, wherein on at least one brake component a friction lining is provided which rubbingly rests against the respective other brake component and inhibits a mutual movement of the brake components, wherein the friction lining has a partly spherical friction surface and the respective other brake component has a partly spherical contact surface for the friction lining, wherein the at least one brake component includes a cutout, wherein a first portion of the friction lining is securely retained by the at least one brake component within the cutout, and wherein a second portion of the friction lining protrudes beyond an outer surface of the at least one brake component, and wherein the friction lining is made of a thermoplastic elastomer which contains a silicone admixture.

2. The brake assembly of claim 1 wherein the silicone admixture is in a range from 0.5% to 5%.

3. The brake assembly claim 1 wherein the friction lining is positively and/or cohesively connected with the at least one brake component.

4. The brake assembly claim 1 wherein the friction lining is arranged on a carrier which is urged against the respective other brake component by spring action.

5. The brake assembly claim 1 wherein the first or the second brake component is coupled with one of a diverter, an operating element or a closing flap.

6. The brake assembly of claim 5 wherein the diverter, the operating element or the closing flap can be pivoted, rotated and/or shifted.

7. A brake assembly for an air vent within a vehicle, the brake assembly comprising:
    a first brake component including a semi-spherical bearing shell;
    a semi-spherical second brake component that couples to the bearing shell, wherein the second brake component includes a cutout, wherein the second brake component is urged against the bearing shell via spring force; and
    a friction lining carried on the second brake component, wherein the friction lining has a semi-spherical friction surface that rests against the bearing shell and inhibits mutual rotation or pivoting of the first and second brake components, wherein a first portion of the friction lining is securely retained by the second brake component within the cutout, wherein a second portion of the friction lining protrudes beyond an outer surface of the second brake component, and wherein the friction lining is formed of a thermoplastic elastomer that contains a silicone admixture.

8. The brake assembly of claim 7, wherein the silicone admixture is in a range from 0.5% to 5%.

9. The brake assembly claim 7, wherein the friction lining is positively and/or cohesively connected with the second brake component.

10. The brake assembly claim 7, wherein the friction lining is arranged on a carrier which is urged against the first brake component by spring action.

11. The brake assembly of claim 10, wherein the diverter, the operating element or the closing flap can be pivoted, rotated and/or shifted.

12. The brake assembly claim 7, wherein the first or the second brake component is coupled with one of a diverter, an operating element or a closing flap.

* * * * *